March 18, 1952  H. S. LABOMBARDE  2,589,944
MACHINE FOR PREBREAKING, GLUING, FOLDING, DELIVERING, AND
STACKING CREASED CARTON BLANKS
Filed April 2, 1948  7 Sheets-Sheet 1

INVENTOR.
Harold S. Labombarde
BY
Heard Smith & Tennant
Attorneys

March 18, 1952    H. S. LABOMBARDE    2,589,944
MACHINE FOR PREBREAKING, GLUING, FOLDING, DELIVERING, AND
STACKING CREASED CARTON BLANKS

Filed April 2, 1948      7 Sheets-Sheet 2

INVENTOR.
Harold S. Labombarde
BY
Heard Smith & Tennant
Attorneys

March 18, 1952 H. S. LABOMBARDE 2,589,944
MACHINE FOR PREBREAKING, GLUING, FOLDING, DELIVERING, AND
STACKING CREASED CARTON BLANKS
Filed April 2, 1948 7 Sheets-Sheet 4

INVENTOR.
Harold S. Labombarde
BY
Heard Smith & Tennant
Attorneys

March 18, 1952 — H. S. LABOMBARDE — 2,589,944
MACHINE FOR PREBREAKING, GLUING, FOLDING, DELIVERING, AND STACKING CREASED CARTON BLANKS
Filed April 2, 1948 — 7 Sheets-Sheet 5

INVENTOR.
*Harold S. Labombarde*
BY
*Heard Smith & Tennant*
Attorneys

March 18, 1952

H. S. LABOMBARDE 2,589,944

MACHINE FOR PREBREAKING, GLUING, FOLDING, DELIVERING, AND STACKING CREASED CARTON BLANKS

Filed April 2, 1948

INVENTOR.
*Harold S. Labombarde*
BY
*Heard Smith & Tennant*
*Attorneys*

Patented Mar. 18, 1952

2,589,944

UNITED STATES PATENT OFFICE 2,589,944

MACHINE FOR PREBREAKING, GLUING, FOLDING, DELIVERING, AND STACKING CREASED CARTON BLANKS

Harold S. Labombarde, Nashua, N. H., assignor to The International Paper Box Machine Company, Nashua, N. H., a corporation of New Hampshire Application April 2, 1948, Serial No. 18,608

34 Claims. (Cl. 93—52)

This invention has for its object to provide a machine which shall take creased carton blanks, prebreak the main creases therein, apply glue to the glue laps, glue and fold the blanks, space and deliver the folded blanks to a stacker in position readily accessible to the operative.

The object of the invention is further to provide an apparatus for pre-breaking carton blanks of that type having a glue lap, a glue lap crease, a center crease, a mid-crease between the glue lap and center creases and a mid-crease in the panel at the opposite side of the center crease, and in which all four creases are folded flat through 180° and preferably ironed at the creases thus producing, when the blank is folded and glued, a 180° balanced prefold glued carton blank.

The object of the invention is further to maintain full control of the blank throughout the entire operation from the time the blank is received from the feeding mechanism until it is delivered completely glued and folded and this quite regardless of the shape or proportions of the blank.

The object of the invention is further to provide means for prebreaking the main creases in creased carton blanks in order that the blanks when glued and folded may be readily set up, either manually or automatically in a filling machine, in open position for filling.

The object of the invention is further to provide means for effectively ironing the creases during the prebreaking operation to render the prebreaking permanent.

The object of the invention is further to provide means for spacing to any desired degree the folded and glued blanks after folding, thus to enable the operations of prebreaking the creases, gluing and folding the blanks to be carried on at high speed and with minimum wear and to prevent twisting or tearing of delicate blanks.

The object of the invention is further to provide means for controlling the travel of the blanks adjacent the glue lap during the prebreaking of the glue lap crease and afterward by the glue lap while the outer panel of the blank is folded, and preferably also while it is opened, in the prebreaking operation.

The object of the invention is further to provide means for breaking the outer panel during the folding on the center crease at the mid crease when necessary to prevent injury to the panel, or where, for example, the end of the panel when folded would overlie the glue lap.

The object of the invention is further to provide means for controlling the opening of a wide outer panel in the prebreaking operation of the center crease in order that the operation may take place at high speed.

The object of the invention is further to provide means enabling the prebroken, glued and folded blanks, whatever may be their path of travel in the final folding operation, to aline with the delivery and stacker mechanism and thus enable a stacker with a narrow lower apron to be employed and the stacked blanks thus to be readily accessible to the operator.

The object of the invention is further to provide a machine which will occupy the minimum amount of space and in which a single comparatively short lower apron in the stacker may be employed.

These and other objects and features of the invention will appear more fully from the accompanying description and drawings and will be particularly pointed out in the claims.

Since the general construction and many of the details in machines of this general type for prebreaking the creases of carton blanks, gluing the glue lap, gluing and folding flat the blanks, and delivering and stacking the blanks are well known and familiar to those skilled in the art, and since these machines are very large and elaborate structures, it is only necessary for an understanding of this invention to illustrate and describe so much of such machines as will disclose the present invention. It will be understood also that in this disclosure many details of construction, such as supports and mounting of the various shafts, gearing, belt tighteners, specific means of adjustment, driving elements, etc., are omitted as unnecessary and as interfering with a consideration of the embodiment of the invention, and will be readily supplied by those skilled in this art.

The complete machine for handling the carton blanks, prebreaking the creases, applying the glue, folding the blanks flat and glued, delivering and stacking the blanks involves in this invention a feeding section for the blanks, a section where the glue lap crease and center crease are prebroken, a final folding section where the blank is folded flat and the glue lap secured in place, and a delivery and stacking section which receives the folded and glued blanks.

The drawings therefore disclose preferred forms of the invention in which a practically limitless range of shapes and sizes of carton blanks may be handled.

In the drawings:

Fig. 24 is a top plan view and Fig. 25 a side elevation of the glue lap folder;

Fig. 26 is a top plan view and Fig. 27 a side elevation of the glue lap opener;

The machine in which the present invention is embodied in its preferred forms is adapted to take a pile of cut and creased carton blanks of any one of a wide range of sizes and designed to form boxes of square or any other rectangular shape, to feed these creased blanks in succession to sections where the glue lap crease and center crease are prebroken, where the other two creases are prebroken, and the blank folded over and the glue lap glued in place after glue has previously been applied thereto, thence to delivery and stacker mechanism in which provision is made for spacing the blanks in the delivery mechanism and in which the folded and glued blanks with all the creases prebroken are stacked in a position where they may be readily reached and handled by the operative. The invention enables this continuous operation to be carried on at a very high rate of speed and with the machine occupying a minimum amount of space.

Figure 29:
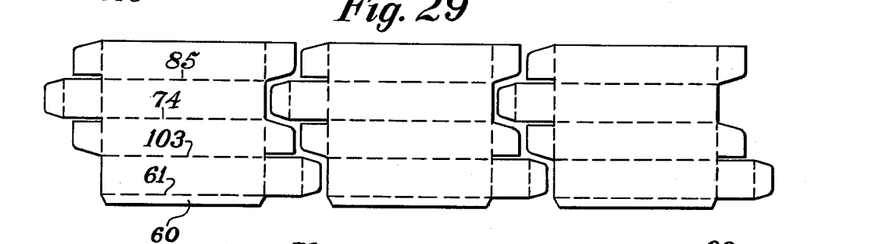
Fig. 29 is a top plan view of the blanks as they pass from the feeding section to the crease prebreaking section.
Figure 30:
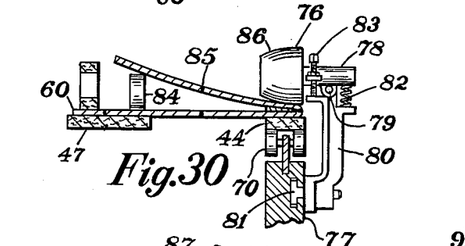
Fig. 30 is a detail in transverse cross section illustrating the center crease ironing roll when acting upon a flexible panel.
Figure 31:
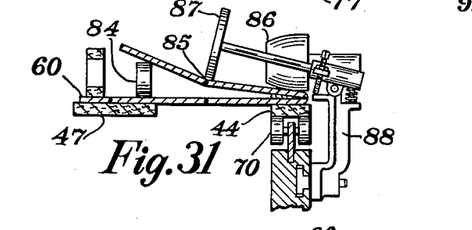
Fig. 31 is a view similar to Fig. 30, showing the mechanism employed when the ironing roll is acting on a non-flexible panel.
Figure 32:
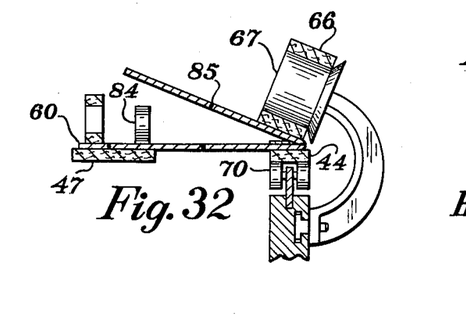
Fig. 32 is a similar view, illustrating the blank as it approaches the center crease ironing position.

Such a machine embodying the invention as noted is adapted to handle a wide range of sizes of carton blanks and it is not unusual for such machine to handle blanks varying in width from 3¾" up to 47" which when glued and folded as delivered to the stacker range from 1¾" to 23" in width and this may be done with the blanks in each case capable of forming boxes of square or any other rectangular shape. Two forms of blank are illustrated in the drawing as typical. A blank like that shown in Fig. 29 with all four sides of equal width is shown in Figs. 30 to 32 and one of the general type of Figs. 33 and 34, that is, with the two wide and two narrow sides, is shown in Figs. 1 to 4, 8 to 12, and 18 to 21.

The machine effects a most thorough prebreaking of the creases by folding at each crease through 180° and preferably by mechanisms which act to iron down each crease with the blank folded flat at the crease. This prebreaking is of great importance in box manufacture because it insures the easy and ready opening of the flat glued and folded carton blank in the setting up of the box for filling. This is important not only when it is performed by hand but still more when the blanks are automatically opened in a high speed box filling machine.

A machine of this type is essentially a friction machine, that is, one in which the carton blanks are started and carried through the entire machine by the frictional grip of cooperating carriers, usually systems of endless belts with roller cages where required cooperating with the belts and further when required yieldingly pressed against the belts. Where these elements are differentiated the lower is referred to as a "carrier" or "carrier means" because it supports the blank and the upper is referred to as "presser means" because it rests upon, and thus serves to press the blanks against, the lower carrier or belt.

Figure 28:
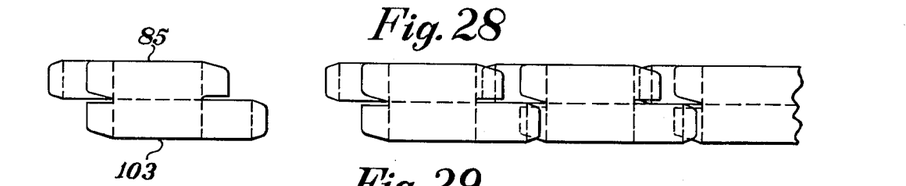
Fig. 28 is a top plan view of a typical form of blank, with the blanks at the right shown as they are passing, glued and folded, from the final folding section, and at the left one of the series of such blanks as it is spaced at the delivery section.

The machine due to its length is necessarily illustrated in sections. It is unnecessary to illustrate the feeding portion of the machine in which the flat creased carton blanks are piled and from which they are successively fed as this mechanism is well known. The blanks as discharged from the feeding mechanism are seized in succession by the upper and lower carriers of the portion of the apparatus shown in Figs. 1 and 2 in which the glue lap and center creases are prebroken through 180° and the carton blanks restored to flat position. Continuing in their travel the blanks enter and pass through the portion of the apparatus shown in Fig. 8. At a suitable point in their travel glue is applied to the glue lap and in the construction shown in Fig. 8 the blank has the second pair of its creases prebroken through 180° and is folded flat and glued. As the blanks travel in succession they follow each other as closely as possible in order to conserve space and maintain high speed and these blanks consequently often overlap as indicated in Fig. 29, with this condition often continuing when the blanks are folded flat and glued with the creases prebroken as shown at the right hand side of Fig. 28. But while this is an efficient arangement for high speed operation in the prebreaking, gluing and folding of the carton blanks they cannot be delivered and stacked until they are substantially separated. The present invention provides, instead of spacing the blanks in the prebreaking and folding operations, for spacing them in the delivery mechanism so that as they are delivered to the stacker they may be readily and efficiently stacked. This feature of the invention in its preferred form is illustrated at the left hand portion of Fig. 8 where the blanks are spaced in the delivery mechanism and passed to the stacker the beginning of which is shown at the extreme left of Fig. 8.

Figures 8, 9, 10, 11, 12, 13, 14:
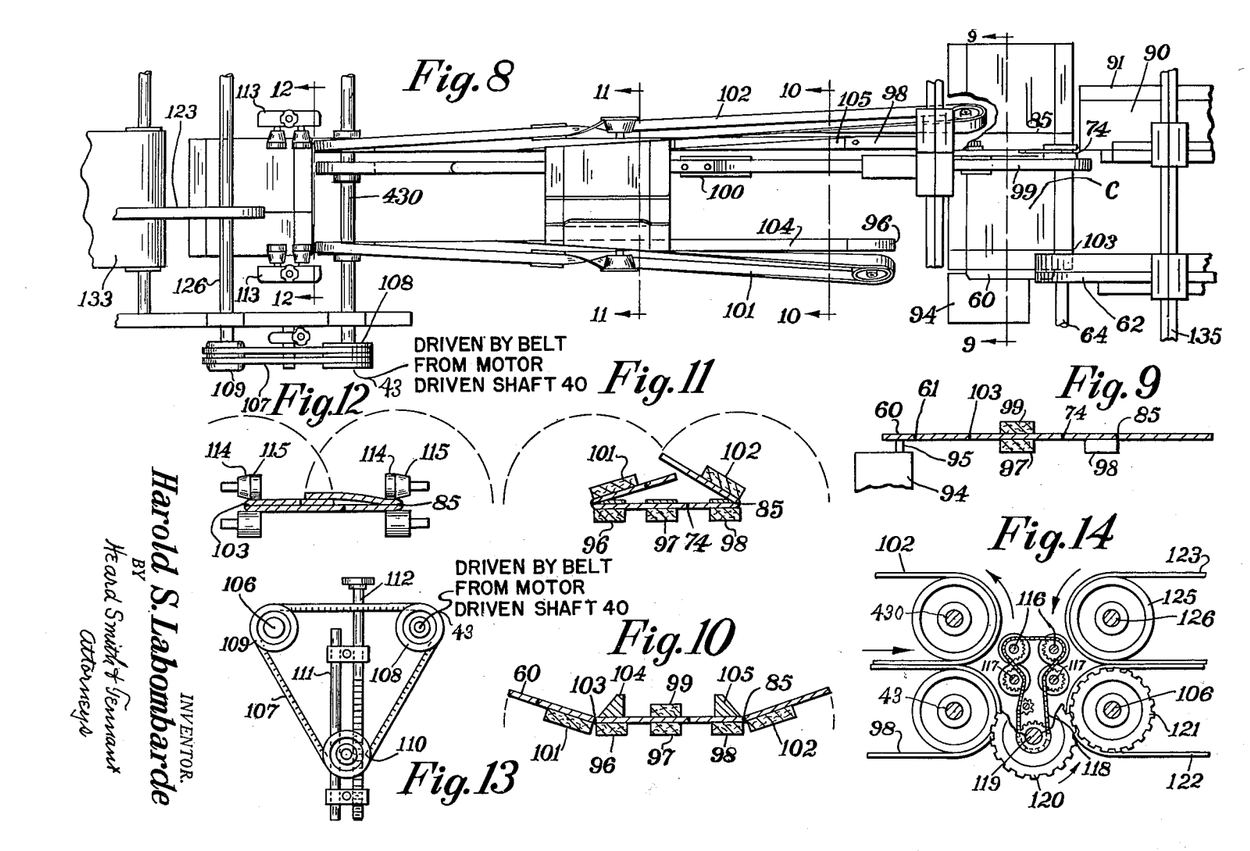
Fig. 8 is a continuation of the top plan view of the machine, showing the final folding section with the end of the prebreaking section as shown in Fig. 1 and the beginning of the delivery and stacker section.
Figs. 9, 10, 11, and 12 are detail views in cross section taken respectively on the lines 9—9, 10—10, 11—11, and 12—12 of Fig. 8, showing the positions of a blank and the elements acting thereon at several successive points in its travel.
Fig. 13 is a detail principally in side elevation of the means illustrated in Fig. 8 for varying the speed of the delivery section with respect to the final folding section.
Fig. 14 is a detail partially in vertical cross section and partially broken away, illustrating the variable speed construction for delivering the blanks from the final folding section and spacing the blanks as received in the delivery and stacking section.
Figures 15, 16, 17:
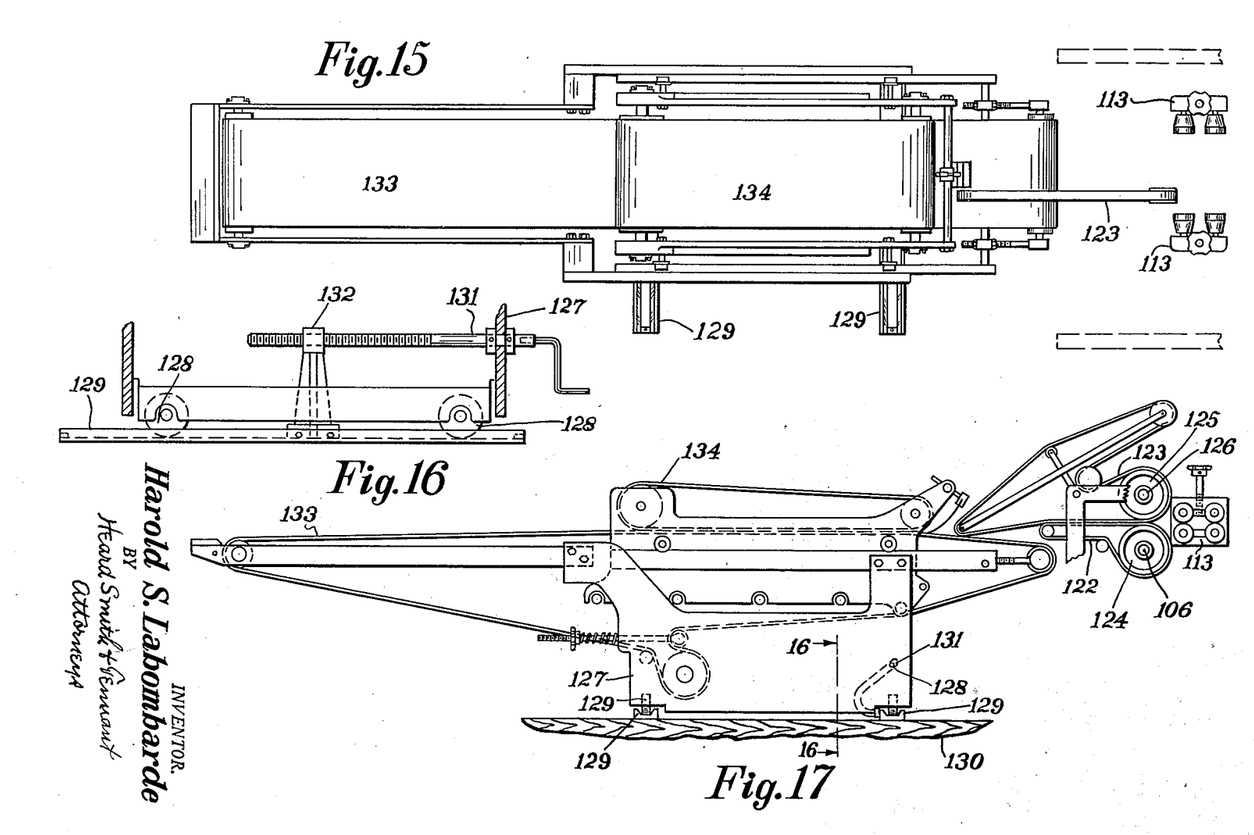
Fig. 15 is a top plan view in continuation of the structure shown in Fig. 8, illustrating the laterally adjustable delivery and stacking section.
Fig. 16 is a detail partially in transverse cross section taken on the line 16—16 of Fig. 17, illustrating the means for laterally adjusting the delivery and stacker section.
Fig. 17 is a view in side elevation of the delivery and stacker section shown in Fig. 15.

Figs. 15 and 17 continue the illustration of Fig. 8 with the spacing means indicated at the right. Since, depending upon the width of the carton blank and also upon the particular rectangular shaped box it is to form, which of course determines the position of the creases, the carton blanks as they are spaced and delivered to the stacker may travel on any of a wide range of paths widthwise of the machine, the stacker must be adapted to receive them. Hitherto wide stacker belts have been employed rendering it difficult for the operative in many cases to reach and handle the blanks as they are stacked. The present invention enables a stacker with a single lower narrow belt, over which the operative may easily reach and handle the stacked blanks, to be employed and positioned to receive the folded blanks in any path of travel.

With this general outline the specific mechanism illustrated for the embodiment of the invention will be readily understood. The main portion of the machine is preferably driven by a motor, not shown but indicated in Fig. 2, connected to the shaft 40. The shafts 41 and 42 at the right hand end are usually geared together at the further side, viewing Fig. 1, and driven by a driving belt extending from the motor driven shaft 40. Another belt also extends from this motor driven shaft 40 to the shaft 43 at the left hand end of the final folding mechanism shown in Fig. 8. The Reeves drive shown in Figs. 8 and 13 effects the drive of the delivery mechanism. The stacker mechanism may be driven by any suitable means but is usually provided with an independent motor.

Figures 6, 7:
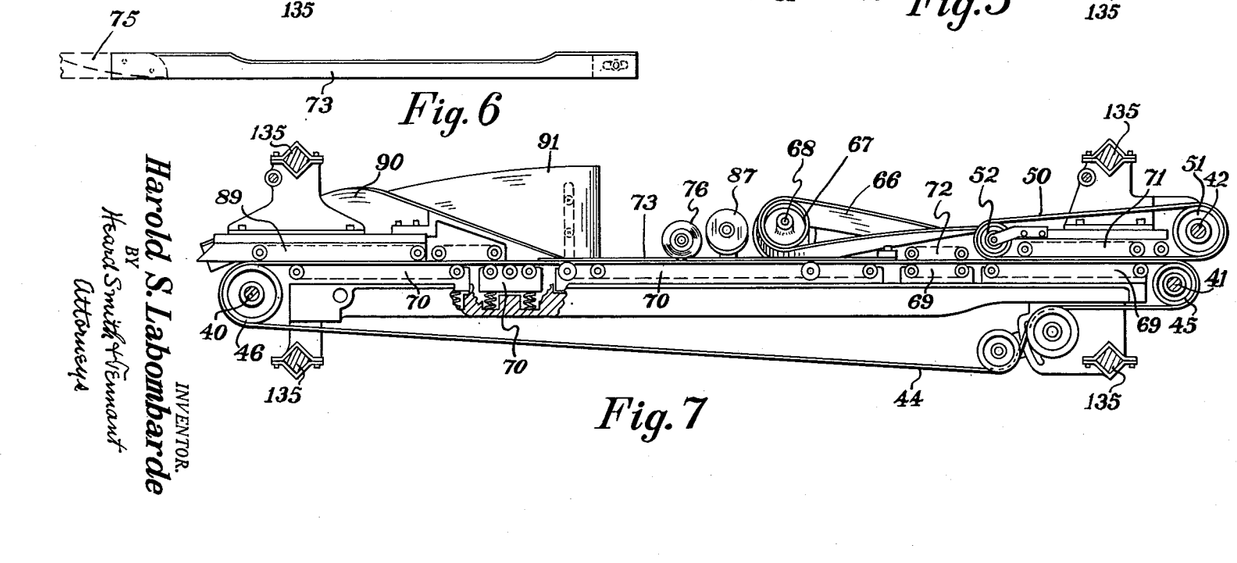
Fig. 6 is a plan view of the float element over which the blank at the center crease is folded.
Fig. 7 is a side elevation partially broken away of the construction shown in Fig. 5.

As a flat blank leaves the feeding mechanism it enters at the right the mechanism shown in Figs. 1, 2, 5, and 7, with its center crease resting on top of the lower carrier constituted as an endless belt 44 extending around the pulley 45 on the shaft 41 and the pulley 46, see Fig. 7, on the shaft 40 and with the body of the blank inside of and adjacent the glue lap 60 resting on the lower carrier constituted as the endless belt 47 extending around the pulley 48 on the shaft 41 and the pulley 49 on the shaft 40. This lower carrier 47 is of sufficient width so that the glue lap may rest thereon. Cooperating with the lower carrier or belt 44 is a short upper carrier shown as an endless belt 50 extending around the pulley 51 on the shaft 42 and around an idler pulley 52 supported from the frame. Cooperating with the lower wide belt 47 at the right of the machine is a narrow upper carrier constituted as a belt 53 extending around the pulley 54 on the shaft 42 and a pulley on the shaft 55 supported from the frame.

Figures 2, 3, 4:
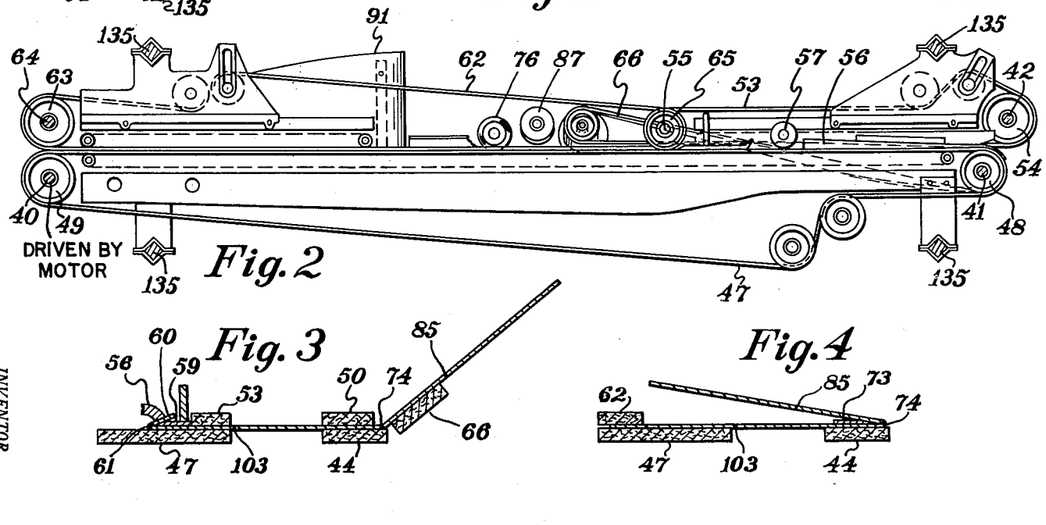
Fig. 2 is a side elevation of the construction shown in Fig. 1.
Fig. 3 is a transverse section enlarged, taken on the line 3—3 of Fig. 1, illustrating the blank and the elements acting thereon to fold the glue lap and center creases.
Fig. 4 is a similar view, illustrating the position of the blank after the glue lap has been opened and the folding of the center crease nearly completed.
Figure 5:
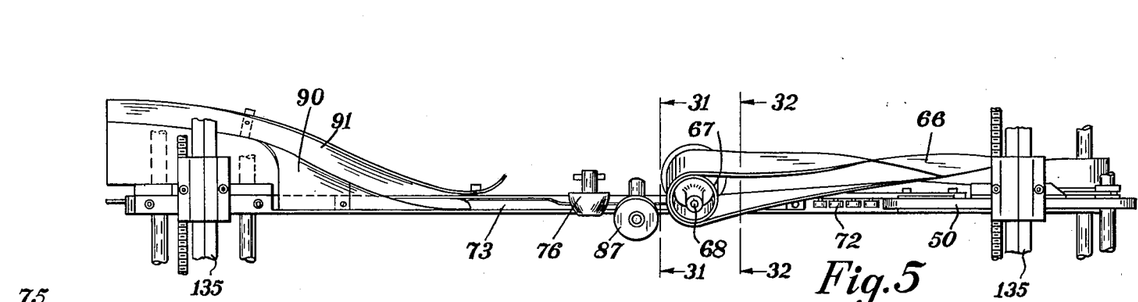
Fig. 5 is a top plan view of the construction shown in Fig. 1, illustrating more in detail the elements concerned with the prebreaking of the center crease.

The blank therefore as it begins its travel through this portion of the machine is gripped by a set of cooperating upper and lower carriers adjacent the center crease, as shown in Fig. 3, and another set inside of and adjacent the glue lap crease.

Figure 1:
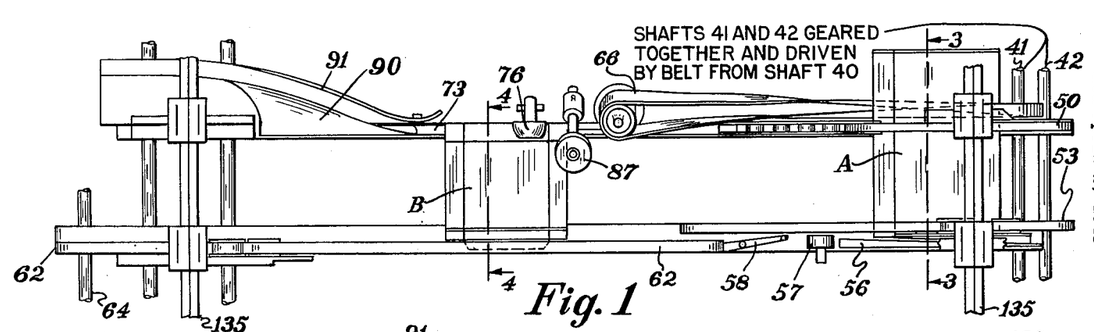
Fig. 1 is a top plan view of a preferred form of construction of the section in which the glue lap crease and center crease are prebroken, with the delivery end of the feeding section and the starting end of the final folding section indicated.
Figure 22:
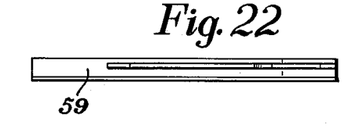
Fig. 22 is a top plan view and Fig. 23 a side elevation of the shoe which cooperates with the glue lap folder.
Figure 23:
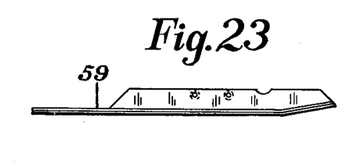
Figures 24, 25, 26, 27:
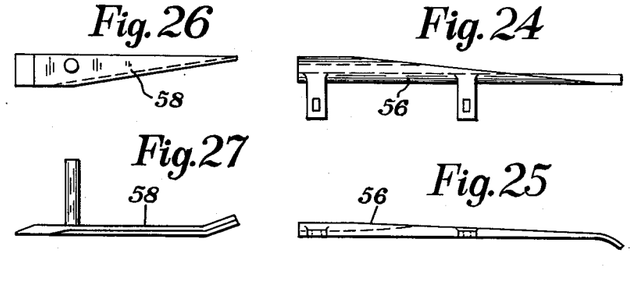

The prebreaking of the glue lap crease, as the blank travels, is effected by a glue lap folder 56 shown separately in Figs. 24 and 25, by an ironing roll 57 and by the glue lap opener 58 shown separately in Figs. 26 and 27. Preferably also a shoe 59, shown separately in Figs. 22 and 23, is provided over which the folder turns the glue lap. These elements are suitably supported over the wide lower carrier 47 at the side of the carrier 53, as shown in Fig. 1. A blank is shown at A at the beginning of the prebreaking of the crease and a cross section at this position is shown in Fig. 3. Here the folder 56 is turning back the glue lap 60 over the shoe 59, thus breaking the glue lap crease 61. As the blank continues its travel the folder completes the folding flat of the glue lap and in this folded condition the blank at the glue lap crease passes beneath the ironing roll 57 and the blank is ironed flat thereby at the glue lap crease. As the travel continues the glue lap is engaged by the opener 58 and turned back to open position. The control of the blank at the glue lap side is now transferred to a secondary carrier cooperating with the lower carrier 47 and constituted as an endless belt 62 extending around a pulley 63 on the shaft 64 which is geared to the shaft 40 and at the other end around the pulley 65 on the shaft 55. These carriers now engage the glue lap thus freeing the way for the folding of the main panel of the blank at the center crease when the entire panel is folded flat.

The prebreaking of the center crease is proceeding at the same time. This prebreaking operation presents a difficult problem which has been solved by this invention. While it is a comparatively simple matter to prebreak the crease of the small glue lap, it is quite different in the case of the center crease. The panel constituting half of the width of the blank has to be swung through an arc of substantially 180° in the folding operation and back through the same arc in the opening operation. This not only requires space but as the blanks are traveling at high speed—frequently one thousand or more feet per minute—the wind resistance is considerable and any tabs or projecting portions of a blank may be caught and turned back. This entire operation must be performed accurately and while the blank is traveling at high speed.

As the blank is fed in and gripped by the lower and upper carrier belts 44 and 50 the outer panel rests upon the belt 66 extending around a pulley on the shaft 41 and twisted and extending at its rearward end around the pulley 67 supported on a shaft 68 over the belt 44 opposite the belt 62. Thus as the blank travels the panel will be gradually raised by the twisted belt 66 and swung downward through an arc of 180° upon the opposite panel. This inner or opposite panel rests upon the belt 44 and this belt is pressed upward by suitable spring pressed roller cages 69 and 70 against roller carriages such as 71 and 72. To the end of the cage 72 there is secured a long thin flat float member 73 shown separately in Fig. 6 and the panel is folded down by the belt at the center crease 74 over this float 73, as shown in Fig. 4. The float at the rear is secured to the tip 75 of the panel opener.

As the blank travels thus folded on the center crease it passes beneath an ironing roll 76 which acts to iron the crease against the lower belt 44. This ironing roll is shown separately in Fig. 30 and is conveniently mounted for longitudinal adjustment on a portion of the frame 77. As illustrated the roll is journaled in a bearing 78 pivoted at 79 on the standard 80 secured at its lower end 81 in a slot of the frame and the roll is forced by a spring 82 downward with its lowermost position limited by the set screw 83.

The position of the blank as it is passing the ironing roll is indicated at B in Fig. 1. Since the blank is now under the control of the upper carrier belt 62 pressing the glue lap into engagement with the lower carrier belt 47, under normal conditions the panel may be ironed down flat against the opposite panel without interference, and is shown approaching this position in Fig. 4. The thin float member 73 is cut away, as shown in Fig. 6, so that its edge opposite the ironing roll is located well away from the crease to permit this to take place.

Under some conditions and on some types of blanks and where, for example, an element such as one of the roller cages indicated at 84 in Figs. 30, 31, and 32, prevents the entire panel from folding flat, or where the panel presents a portion overlying or extending beyond the glue lap and thus prevents the entire panel from folding flat, and the panel is insufficiently flexible to bend over a low pressure cage or pressure means such as 84 without breaking, it is necessary to break the panel at the mid crease 85 of the panel to enagle the panel at the mid crease to be ironed flat. When, however, a low cage 84 is positioned to bear upon the blank beyond the mid crease, as shown for example in Fig. 30, any panel of even slight flexibility will bend sufficiently to enable the panel to be ironed flat at the center crease. The ironing roll is provided with a convexly tapered face 86 so that if the panel is flexible it may bend against this face as shown in Fig. 30. If, however, the panel is not flexible, an element is provided mounted and acting to engage the panel to prebreak the mid crease 85. For this purpose a rotary disk 87 is mounted in advance of the ironing roll and also supported by a similar bracket 88 and adjustable mounting as provided for the ironing roll. Thus as such a blank travels this disk pressing against the panel at the mid crease 85 breaks the crease and enables the ironing roll to iron the center crease flat. Thus it will be seen that depending upon the particular conditions either a suitable ironing roll, or an ironing roll such as described with a convex tapered face, or an element such as the rotary disk, may be used separately or in any desired combination.

Figures 33, 34:
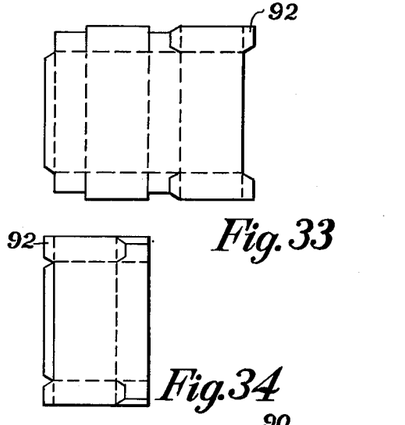
Fig. 33 is a top plan view of a carton blank having a plurality of tabs.
Fig. 34 is a view of a similar blank in final glued and folded position.
Figure 35:
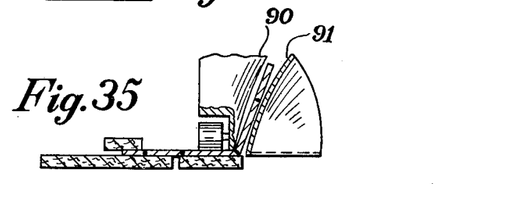
Fig. 35 is a detail in transverse cross section, illustrating the position of the blank as the center crease is being opened.

As the blank continues its travel the inner panel is controlled by the lower carrier belt 44 and pressed against it by the upper fixed cages 89 and with the outer panel riding on the float 73, the outer panel is swung by the opener back through 180° to flat position. In order to control the opening movement of this panel while traveling at high speed and to bring all portions of the panel into flat position there is provided a reversely curved panel opener acting to open the panel together with a cooperating guide associated with the panel opener acting to prevent the blank flaps from bending back or buckling when the blank is moving at high speed. In the preferred construction this panel opener and cooperating guide consists of similar slightly spaced reversely curved plates which act to control the panel throughout its width. These elements may be made of suitable material and sheets of plastic have been found suitable. Preferably the panel opener should have a width corresponding to the maximum width of the panels of cartons which the apparatus is capable of handling. The inner of these plates 90 is the one which at its tip 75 is secured to the float member 73 and the outer 91 is slightly spaced therefrom and both are secured to the frame by suitable supports. This is an important provision because, as shown in Fig. 33, carton blanks are frequently provided with tabs or projections, such as 92, which might be caught and bent back due to wind resistance.

Figure 36:
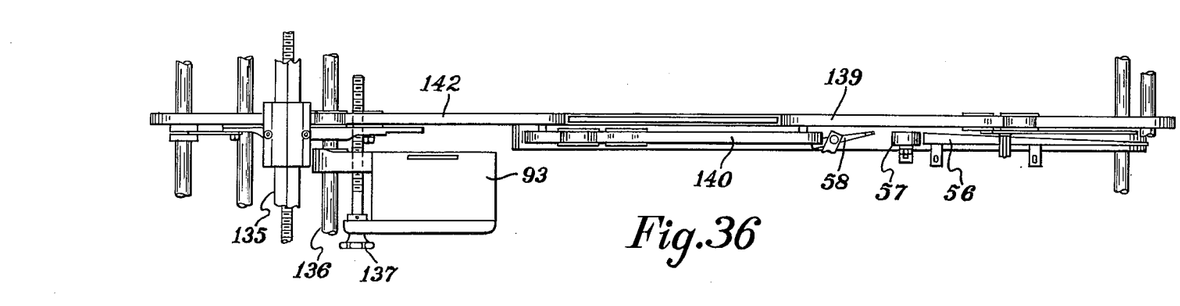
Fig. 36 is a top plan view of a portion of a crease prebreaking section in which the glue pot for applying the glue to the glue lap is located therein.
Figure 37:
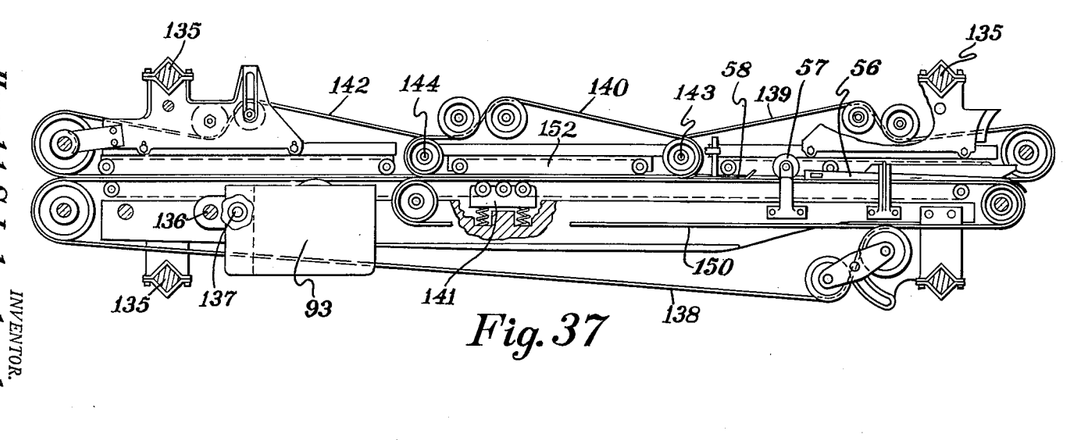
Fig. 37 is a side elevation partially broken away and more in detail of the construction shown in Fig. 36.

The carton blank now lying flat with its glue lap crease 61 and center crease 74 prebroken through 180° and ironed and in the position indicated at C in Fig. 8 travels into the final folding section. Before the final fold is made the glue lap must have the glue applied to its under surface and this operation may be performed at a suitable point in the travel of the blank. In Figs. 36 and 37, to be referred to later, a glue box 93 applies the glue while the outer panel of the blank is moving to open position, while in the construction illustrated in Figs. 8 and 9 a glue box 94 is located to apply the glue as the blank reaches the position C, the glue lap 60 traveling over a glue-applying wheel 95 for that purpose.

The final folding section as illustrated is provided with lower blank-supporting endless carrier belts 96, 97, and 98, the middle of which, 97, extends around a pulley on the shaft 40, which is directly below the shaft 64, while a central upper endless carrier belt 99 at the forward portion extends around a pulley on the shaft 64 and at its rear end around an idler pulley 100 supported from the frame. In this form of the apparatus it will be remembered that the blank is carried from the prebreaking section with the blank gripped at the glue lap by the lower carrier belt 47, which also extends around a pulley on the shaft 40, and the cooperating secondary carrier 62. Thus the blank with the glue lap and center creases prebroken is carried by the glue lap and delivered directly into the grip of the carrier means of the final folding section. In the final folding section at opposite sides are mounted the usual twisted folding belts 101 and 102 extending at their rearward ends over pulleys on the shaft 430 above and geared to the shaft 43. These belts as the blank moves act to fold the blank on the mid crease 103 about the hold-down plate 104 and on the mid crease 85 about the hold-down plate 105 in the usual manner, as indicated in Fig. 10, the three belts being adjusted laterally to support the blank adjacent the three creases. The relative widths of the sections of the blank shown in Figs. 9, 10, 11 and 12 are, for simplicity of illustration, shown somewhat different from the widths in Figs. 1 and 8. The blank, particularly one large or flexible, should be supported at or closely adjacent the previously prebroken center crease, as shown in Figs. 10 and 11, to prevent buckling. The folding operation continues as the blank travels, as indicated in Fig. 11, and finally the outer half of the mid panel is pressed on to the glue lap and the blank reaches the end of the folding section with the mid crease 103 and 85 broken through 180° as well as the glue lap and center crease.

The actual final folding section begins when the final folding of the blank on the mid-crease starts, as when the first of the belts 102 or 101 grips the blank and the prebreaking section ends when the blank has been returned to flat position after folding on both the glue lap crease and the center crease. There is in practice usually an intermediate space where the blank is passing under control as from the carriers 47 and 62 of the prebreaking section to the carriers 97 and 99 which carry the blank to the final folding section.

The folded and glued carton blanks, with all the creases thus prebroken 180°, pass to the delivery section and are delivered thereby to the stacker, the main construction and operation of which may be of standard construction and needs no detail explanation, except in the vitally new features presented by this invention. One important feature is that the spacing of the blanks is performed in this delivery mechanism and at the same time the mid creases are ironed down in this delivery mechanism. The spacing of the blanks is secured by adjusting the speed of the delivery mechanism with respect to that of the final folding section so as to cause any required degree of spacing even up to 100% to be secured. For this purpose a type of Reeves drive is employed connecting the driven shaft 43 to the shaft 106 driving the delivery mechanism. Such a drive is illustrated in Figs. 8 and 13. A plurality of V-belts 107 extend around pulleys 108 on the shaft 43, around the automatically adjustable pulleys 109 on the shaft 106, and around the adjustable pulleys 110 carried by a slide on the standard 111 and adjusted up and down by the screw 112, thus in accordance with the well known principle enabling a very accurate adjustment of the speed of the shaft 106 to be made with respect to that of the driven shaft 43. This spacing of the blanks in the delivery mechanism is a very important feature because if the spacing has to be done in the feeding section then the entire machine must run at a high rate of speed throughout, while if the spacing is done in the delivery section the main portion of the machine may run at moderate speed and then the spacing rapidly secured in the delivery section, thus reducing the wear and the amount of power required. Furthermore, with this invention the spacing may be instantly set at any required amount while the machine is in full speed operation and without in any way affecting the accuracy of the prebreaking, glue-applying and folding operations.

Preferably also the mid creases of the finally folded blanks are ironed simultaneously with the speeding up of the travel of the blanks to effect the spacing and for that purpose the ironing rolls are driven from the shaft 106 or the shaft to which the Reeves drive is connected. As illustrated sets of upper and lower ironing rolls are located at each side of the blank to engage and grip the opposite creased edges of the flat folded blanks. These ironing rolls are journaled in standards 113 mounted on the machine frame. The rolls are arranged in pairs one roll of each pair being above and the other below the blank at each edge. As shown there are two pairs at each edge of the blank. At least one roll of each pair, as illustrated the upper roll, presents a cylindrical section 114 at its inner face and a tapering or conical section 115 at its outer face. This is important because the position of the rolls is adjusted so that the cylindrical portions grip and positively feed the blanks in the spacing operation, while the tapering or conical portion is positioned to give the proper ironing pressure required for the breaking of the crease and prevent taper or skew folding of the blanks.

These spacing rolls have two very important functions as indicated. First, as a part of the delivery mechanism they act to secure by reason of the speed to which they are adjusted any required degree of spacing in the delivery section. Thus the feed of the blanks to the apparatus, the entire prebreaking of the creases, the gluing of the glue lap and the final folding and gluing, that is, the entire operation of the apparatus up to the delivery may operate at the same speed and the spacing takes place in the delivery after any variations in speed of the various carriers could have any twisting effect upon the folding. Second, since the ironing rolls are each separately adjustable at each side any required gripping pressure may be applied to give a positive action in delivering and spacing the folded blanks. The cylindrical section of each roll is the one which acts to feed the blanks and the adjustment is so made that these cylindrical sections are positioned laterally so that the tapered sections only bear sufficiently on the folded blanks at the creases to give a proper ironing pressure. Consequently, any danger of the blank where folded at the creases becoming twisted or skewed is avoided and the blanks are fed firmly and positively with the creases properly ironed and without danger of tapering of the fold.

The shafts 116 of the upper rolls and 117 of the lower rolls, as shown in Fig. 14, at each side are provided with sprocket wheels and these sprocket wheels are engaged by sprocket chains 118 extending over sprocket wheels on a shaft 119 having a gear 120 engaging a gear 121 on the shaft 106, thus these rolls act to space the blanks in accordance with the adjustment of the Reeves drive.

The folded spaced blanks now successively are carried along gripped between the usual lower endless belt 122 and the usual upper endless belt 123 of the delivery mechanism shown as of a standard form in Figs. 15 and 17, the belt 122 being driven by a pulley 124 on the shaft 106 and the belt 123 by a pulley 125 on the shaft 126 geared thereto.

The spaced folded carton blanks are delivered from the belts 122 and 123 of the delivery mechanism to the stacker shown in Figs. 15, 16, and 17, which, except for the novel features of the invention, may be of standard construction. This stacker comprises a base 127 mounted on rollers 128 fitting tracks 129 secured to the floor 130 with the tracks extending transversely of the machine. Thus the entire stacker may be moved bodily transversely and a suitable means is provided for thus adjusting it into any desired transverse position. For that purpose there is shown in Fig. 16 a shaft 131 journaled against endwise movement in the base 127 and having a screw threaded portion engaging a standard 132 secured to the floor within the base.

The lower or main endless apron 133 of the stacker cooperates with an upper cooperating endless apron 134 and this upper apron is bodily adjustable fore and aft as required. Thus the lower apron extends forward in advance of the upper to receive the folded spaced blanks and extends well rearward beyond the upper to form a support for the stacked blanks. The lower belt is made of a width equal to substantially one-half the width less the width of the glue lap of the largest blank of the range for which the machine is built and thus even for very large blanks its width is such that an operative may stand beside the rearward exposed stacker portion and readily and easily have access to and handle the blanks. Thus the entire stacker mechanism occupies a minimum amount of space and is readily accessible to the operative. This result is secured by reason of the provision for the bodily adjustment of the stacker which enables it to be brought into position to aline itself with any size and type of folded blanks which are delivered from the final folding mechanism.

The entire mechanisms for pre-creasing, gluing, folding, spacing and delivering the blanks are readily adjustable to any size and arrangement of crease within the range of the machine and as the means for such adjustments are of a well known and familiar type they need no detailed illustration or description. The main frame of the machine is provided with the usual transverse bars, such as 135, along which the various frame members and supports may be adjusted and the various pulleys are keyed to the shafts and adjustable therealong and the other parts made adjustable transversely, all in a familiar manner.

Figure 18:
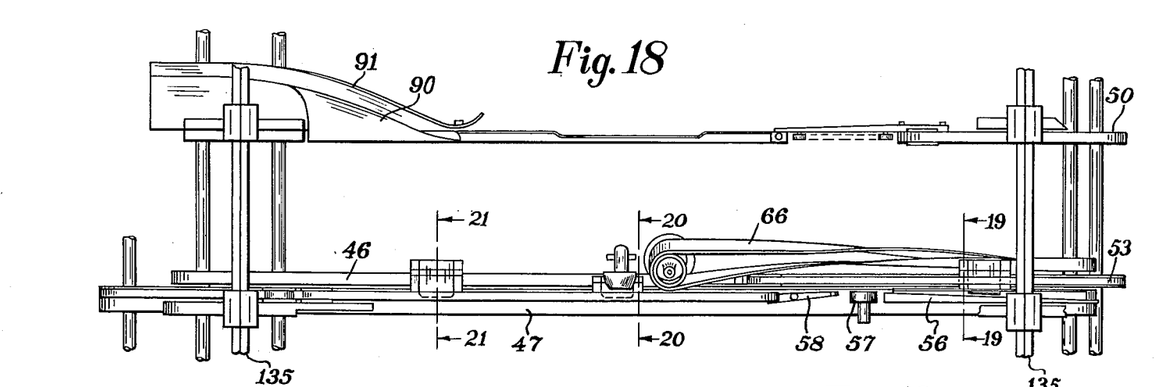
Fig. 18 is a view of the construction of the crease prebreaking section, such as is shown in Fig. 1, with the elements adjusted as required for the handling of blanks of very small size.
Figures 19, 20:
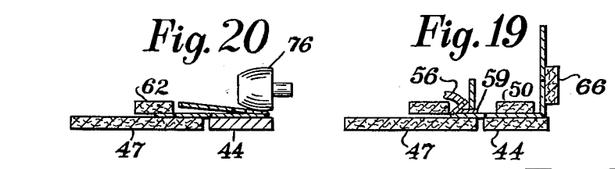
Figs. 19, 20, and 21 are details showing on a large scale in cross section, taken respectively on the lines 19—19, 20—20, and 21—21 of Fig. 18, a blank and the elements acting thereon at successive points in its travel.
Figure 21:
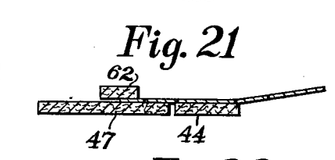

A particular arrangement when extremely small blanks are to be handled by the machine is further illustrated in Figs. 18–21. Since in this case there is no difficulty in opening the panel after the center crease has been prebroken the elements, including the large reversely curved opener plates 90 and 91, may be adjusted as shown in Fig. 18 off to one side and the twisted panel-folding belt 66 together with the cooperating lower carrier belt 44 is adjusted up close to the lower carrier belt 44 and the elements for folding, ironing, opening and controlling the blank travel adjacent to or by the glue lap are moved inward according to the size of the blank, all as illustrated in these figures.

As previously noted it is desirable under some conditions to locate the glue pot and apply the glue to the glue lap in the section in which the glue lap crease and center crease are prebroken and such a construction is illustrated in Figs. 36 and 37 which show only the left hand side of the machine, the right hand side for handling the panel on the center crease being as previously described and illustrated in Figs. 1, 2, 5 and 30 to 32. Here the glue pot 93 is shown carried on a shaft 136 projecting from the frame and adjustable transversely by means of the screw threaded shaft 137 so as to bring the glue wheel into alinement with the glue lap. In this case the lower or central carrier belt 138 and the primary cooperating upper carrier belt 139 are arranged corresponding to the belts 47 and 53 previously described with the blank traveling under the control of these two carrier belts gripping the blank adjacent the glue lap and carrying the glue lap through the folder, under the ironing roll and through the opener, all in the manner previously described. Then with the glue lap brought to open position the blank passes under the control of a secondary upper carrier belt 140 cooperating with a second or left hand lower carrier belt 150 and gripping the blank by the glue lap. The belt 150 extends in its upper run parallel to the belt 138 to and around the pulley 151 and is driven by a pulley on the same shaft as and alongside the pulley that drives the belt 138. During the travel of the blank to the point just short of the glue pot 93 the upper run of this second lower carrier belt 150 is pressed by the spring mounted roller cages 141 against the belt 140 and the upper carrier belt 140 is pressed by a roller cage 152. Now since the glue pot must be brought in close to engage with the glue lap the control of the blank is passed to a third upper carrier belt 142 cooperating with the lower belt 138 gripping the blank adjacent the glue lap and carrying the blank past the gluing position. Thus there is left between the opposing ends of the belts 139 and 142 a space enabling the panel of the blank in the prebreaking of the center crease (traveling on the third or right hand lower belt 44 as previously described) to be folded down as heretofore described on this right hand lower belt bending against the low cage 152 similarly as in the case of the cage 84. It is important that the three upper carrier belts 139, 140 and 142 should be synchronized to run at the same speed with the lower carrier belt and to secure this the rearward end of the belt 139 and the forward end of the belt 140 extend over the pulleys keyed to a common shaft 143 and the forward end of the belt 142 and the rearward end of the belt 140 extend over pulleys keyed to a common shaft 144, with all four pulleys of the same diameter.

It will thus be seen that in all forms of the apparatus the blank at each of its four creases is folded flat through 180° and the crease pressed flat and preferably ironed down so that each crease is thoroughly prebroken. Thus there is produced an entirely new result, namely a 180° balanced prefolded glued carton blank. This means that the opposing forces or the resistance encountered in opening the blank, either when opened by hand or when opened in automatic packaging machinery, are equal in every panel and every crease, and this is true whether the folded blank is opened by pressure on the opposite corners or by suction on one or more of the panels and constitutes a feature of the highest importance in the efficient operation of filling or packaging machines. Furthermore, the apparatus maintains control of the blank throughout the entire operation from the time the blank is received from the feeding mechanism until it is delivered completely glued and folded and this control is maintained quite regardless of the shape or proportions of the blank.

There has thus been set forth simple and preferred forms of construction embodying the various features of the invention and presenting a highly efficient machine occupying a minimum space, capable of being operated at a high rate of speed and handling a wide range of creased carton blanks.

Having thus described the invention, what is claimed as new and desired to be secured by Letters Patent, is:

1. In an apparatus for prebreaking carton blanks having a glue lap, a glue lap crease, a center crease, a mid-crease between the glue lap and center creases, and a mid-crease in the panel at the opposite side of the center crease, the combination of supporting and cooperating superposed carriers acting to move the blank therethrough, panel folder and panel opening means acting successively to prebreak the center crease and return the panel to open position, an ironing roll cooperating with a supporting carrier acting to iron the panel flat through 180° at the center crease as the panel is folded and a thin flat float member over which the panel is folded extending forward from the panel opener past the ironing roll above the lower carrier and recessed opposite the ironing roll to permit the ironing roll to iron the panel at the center crease directly against the lower carrier.

2. The combination in a creased carton blank prebreaker as defined in claim 1 in which the ironing roll presents a tapered face extending from the crease ironing zone to enable the blank to be ironed flat at the crease with the upper panel bent away from the body of the blank.

3. In an apparatus for prebreaking carton blanks having a glue lap, a glue lap crease, a center crease, a mid-crease between the glue lap and center creases, and a mid-crease in the panel at the opposite side of the center crease, the combination of supporting and cooperating superposed carriers acting to move the blank therethrough, panel folder and panel opening means acting successively to prebreak the center crease and return the panel to open position, an ironing roll presenting a tapered face extending from the crease ironing zone and cooperating with a supporting carrier acting to iron the panel flat through 180° at the center crease as the panel is folded and a thin flat float member over which the panel is folded extending forward from the panel opener past the ironing roll above the lower carrier and recessed with its edge opposite the ironing roll located away from the crease to permit the ironing roll to engage and iron the panel at the center crease directly against the lower carrier.

4. The combination in a creased carton blank prebreaker as defined in claim 3, together with a disc mounted to rotate above the supporting carrier in advance of the ironing roll and acting to engage the folded panel at the mid-crease thereof and break the said crease if resistance is presented which prevents the outer portion of the panel from folding flat.

5. In an apparatus for prebreaking carton blanks having a glue lap, a glue lap crease, a center crease, a mid-crease between the glue lap and center creases and a mid-crease in the panel at the opposite side of the center crease, a final folding section having two sets of upper and lower ironing rolls positioned to engage and grip the opposite mid-creased edges of the folded flat blanks, means for driving said rolls simultaneously to iron the mid-creases and forward the blanks, and in which each ironing roll presents a cylindrical portion bearing upon the blanks inward of the mid-crease and a tapered portion bearing upon the mid-crease.

6. A creased carton blank folding machine as defined in claim 5, in which there are two pairs of ironing rolls at each edge, with one roll of each pair acting upon the top and the other roll of each pair upon the bottom of the blanks.

7. A creased carton blank folding machine as defined in claim 5, in which each ironing roll presents a cylindrical portion engaging the blank inward of the mid-crease and a tapering portion bearing upon the mid-crease.

8. In an apparatus for prebreaking carton blanks having a glue lap, a glue lap crease, a center crease, a mid-crease between the glue lap and center creases, and a mid-crease in the panel at the opposite side of the center crease, the combination of a glue lap folder, a glue lap opener and a glue applier, a lower carrier for supporting the blank as it travels past said elements, a primary upper carrier cooperating with the lower carrier and engaging the blank body adjacent the glue lap as the blank travels past said folder and opener, a secondary upper carrier cooperating with the lower carrier and engaging the glue lap after it is opened further to advance the blank, a third upper carrier alined with and spaced from the primary carrier cooperating with the lower carrier to engage the body of the blank adjacent the glue lap and advance the blank past the glue applier, and an upper roller cage cooperating with the lower carrier in the space between the primary and third upper carriers.

9. The combination in a creased carton blank prebreaker as defined in claim 8 together with a panel folder and panel opener acting successively to prebreak the center crease and return the panel to open position, an ironing roll mounted opposite the said roller cage to iron the center crease, and a rotatable disk mounted in advance of the ironing roll to engage the folded panel at the mid-crease thereof and break the said crease when the outer portion of the panel is folded against said cage.

10. In an apparatus for prebreaking carton blanks having a glue lap, a glue lap crease, a center crease, a mid-crease between the glue lap and center creases, and a mid-crease in the panel at the opposite side of the center crease, the combination of means for moving the blank therethrough, means acting as the blank moves for folding the panel at the center crease, means acting as the blank continues to move to iron the panel flat at the crease and means acting simultaneously with the ironing operation to bend the panel toward open position.

11. A creased carton blank prebreaking apparatus having the construction and operation defined in claim 10 in which the ironing means is a roll having a convex taper permitting the panel to bend thereagainst without breaking.

12. A creased carton blank prebreaking apparatus having the construction and operation defined in claim 10 together with means for prebreaking the mid-crease in the panel as the ironing operation proceeds to permit the simultaneous ironing and opening in the case of narrow or non-flexible panels.

13. In an apparatus for prebreaking carton blanks having a glue lap, a glue lap crease, a center crease, a mid-crease between the glue lap and center creases, and a mid-crease in the panel at the opposite side of the center crease, and cooperating carriers acting to move the blank therethrough, the combination of means for folding the panel on the center crease, a reversely curved panel opener acting to open the panel, a thin flat float member over which the panel is folded extending forward from the panel opener and a cooperating guide associated with the panel opener acting to prevent the blank flaps from bending back or buckling when the blank is moving at high speed.

14. In an apparatus for prebreaking carton blanks having a glue lap, a glue lap crease, a center crease, a mid-crease between the glue lap and center creases, and a mid-crease in the panel at the opposite side of the center crease, and cooperating carriers to move the blank therethrough, the combination of means for folding the panel on the center crease, a panel opener, and a thin flat float member over which the panel is folded extending forward from the panel opener through the folding position.

15. In a creased carton blank prebreaker for carton blanks having a glue lap, a glue lap crease, a center crease, a mid-crease between the glue lap and center creases, and a mid-crease in the panel at the opposite side of the center crease, the combination of a panel folder and panel opener acting successively to prebreak the center crease and return the panel to open position, means for moving the blank through the prebreaker including supporting and cooperating superposed carriers engaging the blank near the glue lap opposite the panel opener, and an ironing roll cooperating with a supporting carrier acting to iron the center crease as the blank is folded at the center crease, the said ironing roll having a tapered face extending from the crease ironing zone to enable the blank to be ironed flat at the crease with the upper panel engaging the carrier adjacent the glue lap and bent against the tapered face.

16. In an apparatus for prebreaking and folding carton blanks having a glue lap, a glue lap crease, a center crease, a mid-crease between the glue lap and center creases, and a mid-crease in the panel at the opposite side of the center crease, the combination of a prebreaking section including means for folding and opening the glue lap on the glue lap crease and the panel on the center crease, a final folding section having means for folding the blank on the two mid-creases, means for continuously and successively forwarding the blanks through the said sections, ironing rolls at each side of the prebreaking section and at each side of the final folding section acting to iron the blanks flat when folded at the glue lap crease, when folded at the center crease, and when folded at the mid-creases, thus to cause the folded cartons delivered from the final folding section to have complete balanced 180° prefold of the four creases.

17. In an apparatus for prebreaking and folding carton blanks having a glue lap, a glue lap crease, a center crease, a mid-crease between the glue lap and center creases, and a mid-crease in the panel at the opposite side of the center crease, the combination of a prebreaking section including means for folding and opening the glue lap on the glue lap crease and the panel on the center crease, a final folding section having means for folding the blank on the two mid-creases, means for continuously and successively forwarding the blanks through the said sections, presser elements at each side of the prebreaking section and at each side of the final folding section extending above the folded blank at the several creases acting to press the blanks flat when folded at the glue lap crease, at the center crease, and at the two mid-creases, thus to cause the folded cartons delivered from the final folding section to have complete balanced 180° prefold of the four creases.

18. In an apparatus for prebreaking carton blanks having a glue lap, a glue lap crease, a center crease, a mid-crease between the glue lap and center creases, and a mid-crease in the panel at the opposite side of the center crease, the combination of cooperating lower carrier means and upper presser means acting to grip the glue lap and forward the blanks, a lower carrier means for supporting the center crease, panel folding and opening devices acting successively to fold and to open the panel at the center crease and, in said operations, acting to complete the said folding and to begin the opening of the panel while the blanks are being forwarded by the glue lap with the panel bent against an upper presser means, and a presser element acting to press the panel, while thus bent, flat against the lower carrier means at the center crease.

19. In an apparatus for prebreaking carton blanks having a glue lap, a glue lap crease, a center crease, a mid-crease between the glue lap and center creases, and a mid-crease in the panel at the opposite side of the center crease, the combination of cooperating lower carrier means and upper presser means acting to grip the glue lap and forward the blanks, and a lower carrier means for supporting the center crease, panel folding and opening devices acting successively to fold and to open the panel at the center crease and, in said operations, acting to complete the said folding and to begin the opening of the panel while the blanks are being forwarded by the glue lap with the panel bent against an upper presser means, and a tapered face ironing roll acting to press the blank, while thus bent, flat against the lower carrier means at the center crease.

20. In an apparatus for prebreaking carton blanks having a glue lap, a glue lap crease, a center crease, a mid-crease between the glue lap and center creases, and a mid-crease in the panel at the opposite side of the center crease, the combination of three lower carrier belts, a plurality of upper presser means cooperating with a plurality of the lower carrier belts acting to receive and forward the blanks successively fed thereto, the central lower carrier belt and one of the upper presser means acting to grip the blanks adjacent the glue lap crease and forward the blanks while the glue lap is first folded down on to, and then opened flat against, the left hand lower carrier belt, a second upper presser means cooperating with the left hand lower carrier belt acting thereupon to grip the opened glue lap and forward the blanks, and panel folding, ironing and opening devices acting successively, while the blanks are being forwarded by the glue lap and while the center crease is traveling on the right hand lower carrier belt, to fold the panel at the center crease bending it against the upper presser means cooperating with the left hand lower carrier belt, to iron the blank at the center crease flat and to start the opening of the panel.

21. In an apparatus for prebreaking carton blanks having a glue lap, a glue lap crease, a center crease, a mid-crease between the glue lap and center creases, and a mid-crease in the panel at the opposite side of the center crease, the combination of a glue lap folder, a glue lap crease ironer and a glue lap opener, a plurality of lower carrier means for supporting the blank as it travels, a primary endless upper carrier belt cooperating with one of the lower carrier means and engaging the blank body as the blank travels past said folder, ironer and opener, upper presser means cooperating with one of the lower carrier means and engaging the glue lap after it is opened, and folding and ironing means acting to fold flat and iron the blank at the center crease and to complete the said folding operation and perform the ironing while the blank is being forwarded by the glue lap, and a third upper presser means cooperating with one of the lower carrier means to engage the blank inside of the glue lap crease and continue the control of the blank through the prebreaker.

22. In an apparatus for prebreaking and folding carton blanks having a glue lap, a glue lap crease, a center crease, a mid-crease between the glue lap and center creases, and a mid-crease in the panel at the opposite side of the center crease, the combination of a glue lap and center crease prebreaking section having a plurality of lower carrier belts and at least two upper presser means acting to receive the blanks fed thereto, a final folding section with three lower carrier belts and presser means acting to receive the blanks from the prebreaking section and advance the blanks, and means for folding the blanks on the mid-creases, one of said carrier belts of the prebreaking section and a cooperating presser means engaging the blanks adjacent the center crease and another of said belts and a cooperating presser means engaging the blanks adjacent the glue lap crease and gripping the blanks until delivered into the grip of a lower carrier belt and cooperating presser means of the final folding section, and means for folding the blanks on the center crease flat through 180° and then opening the blanks while the blanks are traveling gripped adjacent the glue lap crease.

23. In an apparatus for prebreaking and folding carton blanks having a glue lap, a glue lap crease, a center crease, a mid-crease between the glue lap and center creases, and a mid-crease in the panel at the opopsite side of the center crease, the combination of a center crease prebreaking section, a final folding section having three lower carrier belts and a presser means acting to receive the blanks from the prebreaking section and advance the blanks and having means for folding the blanks on the mid-creases, the said prebreaking section having a plurality of lower carrier belts and at least two upper presser means acting to receive the blanks fed thereto, with one of said carrier belts of said prebreaking section and a cooperating presser means engaging the blanks adjacent the center crease until delivered to the center crease folding means and another of said belts and a cooperating presser means engaging the blanks adjacent the glue lap crease and gripping the blanks until delivered into the grip of a lower carrier belt and cooperating presser means of the final folding section, and means for folding the blanks both on the glue lap crease and on the center crease flat through 180° and then opening the blanks on the said creases while the blanks are traveling gripped adjacent the glue lap crease.

24. In an apparatus for prebreaking carton blanks having a glue lap, a glue lap crease, a center crease, a mid-crease between the glue lap and center creases and a mid-crease in the panel at the opposite side of the center crease, the combination of a plurality of lower carriers and upper presser means for advancing the blank therethrough, panel folding and panel opening means acting as the blank travels to fold the panel flat through 180° at the center crease and then to open the panel, one of the upper presser means being of low height and cooperating with one of the lower carriers to grip the blank during the completion of the folding and the beginning of the opening of the panel and positioned between the first-named mid-crease and the glue lap edge of the blank, to permit the said folding of the panel flat at the center crease, and glue lap folding and opening means acting to fold the glue lap flat through 180° at the glue lap crease and then to open the glue lap during the travel of the blank.

25. An apparatus for prebreaking carton blanks having the construction and operation described in claim 24, in which the said lower carrier and upper presser means grip the blank at the glue lap during the completion of the panel folding and the beginning of the panel opening.

26. In an apparatus for prebreaking carton blanks having a glue lap, a glue lap crease, a center crease, a mid-crease between the glue lap and center creases and a mid-crease in the panel at the opposite side of the center crease, the combination of a plurality of lower carriers and upper presser means for advancing the blank therethrough, one of said lower carriers extending beneath the glue lap crease and one beneath the center crease, glue lap folding and opening means acting to fold the glue lap flat through 180° at the glue lap crease against the first-named lower carrier and then to open the glue lap, panel folding and opening means acting to fold the panel flat through 180° at the center crease against the second-named lower carrier and then to open the panel, one of said upper presser means and the first-named lower carrier acting to grip the blank by the open glue lap and advance the blank during the completion of the folding and the beginning of the opening of the panel.

27. In an apparatus for prebreaking and folding carton blanks of the type defined and having the construction and operation defined in claim 26, the provision of rotatable ironing elements, one above the glue lap crease and one above the center crease, acting respectively to iron the glue lap crease against the first lower carrier when the glue lap is folded flat and to iron the center crease against the second lower carrier when the panel is folded flat.

28. In an apparatus for prebreaking carton blanks having a glue lap, a glue lap crease, a center crease, a mid-crease between the glue lap and center creases and a mid-crease in the panel at the opposite side of the center crease, the combination of three lower carriers and a plurality of upper presser means for advancing the blank therethrough, the first lower carrier extending beneath the center crease, the second beneath the glue lap crease and the third intermediate said creases, a twisted belt cooperating with the first lower carrier acting to fold the panel flat through 180° at the center crease against the first lower carrier, means for opening the panel having a cooperating panel guide acting to prevent any portion of the panel from bending back or buckling, glue lap folding and opening means acting to fold the glue lap flat through 180° at the glue lap crease against the second lower carrier and then to open the glue lap, one of said upper presser means being a low pressure cage cooperating with the third lower carrier to grip and carry the blank during the completion of the folding and the beginning of the opening of the panel with the panel bending thereagainst.

29. An apparatus for prebreaking carton blanks having the construction and operation defined in claim 28, together with a final folding section having means for folding the blank flat through 180° on the mid-creases, carrier means for advancing the blank therethrough, with one of the aforesaid three lower carriers acting to deliver the open blank directly into the grip of the said carrier means of the final folding section.

30. In an apparatus for prebreaking carton blanks having a glue lap, a glue lap crease, a center crease, a mid-crease between the glue lap and center creases and a mid-crease in the panel at the opposite side of the center crease, the combination of a plurality of lower carriers, means to advance the blank by gripping the glue lap against one of the lower carriers, means to fold the panel on the center crease flat through 180° against another one of the lower carriers while the blank is advanced by the glue lap, means for opening the panel having a cooperating panel guide acting to prevent any portion of the advancing panel from bending back or buckling, a final folding section for folding the blank on the mid-creases, carrier means for advancing the blank therethrough, one of the aforesaid lower carriers acting to deliver the open blank directly into the grip of the said carrier means of the final folding section.

31. In an apparatus for prebreaking carton blanks having a glue lap, a glue lap crease, a center crease, a mid-crease between the glue lap and center creases, and a mid-crease in the panel at the opposite side of the center crease, the combination of a glue lap folder and a glue lap opener, lower carrier means supporting the blank as it travels, a primary upper carrier cooperating with the lower carrier means and engaging the blank adjacent the glue lap as the blank travels past said folder and opener, a secondary upper carrier cooperating with the lower carrier means and engaging the glue lap after it is opened, panel folding and opening means acting to fold the panel flat at the center crease and then to open the panel with the said folding of the panel completed and the opening thereof begun while the glue lap is engaged by the secondary upper carrier and the lower carrier means, the said upper carriers successively maintaining with the lower carrier means uninterrupted control of the blank.

32. In an apparatus for prebreaking and folding carton blanks having a glue lap, a glue lap crease, a center crease, a mid-crease between the glue lap and center creases, and a mid-crease in the panel at the opposite side of the center crease, the combination of supporting carriers and superposed presser means cooperating therewith acting to grip and move the blank therethrough, glue lap crease prebreaking means at one side of the path of blank travel acting to fold flat through 180° the glue lap at its crease and then to open the glue lap, and center crease prebreaking means at the opposite side acting to fold the panel through 180° flat at the center crease and then to open the panel while the blank is moved gripped by a supporting carrier and a superposed presser means engaging the glue lap.

33. In an apparatus for prebreaking and folding carton blanks of the type defined and having the construction and operation defined in claim 32, the provision of rotatable ironing elements, one above the glue lap crease and one above the center crease, acting respectively to iron the glue lap crease when the glue lap is folded flat and the center crease when the panel is folded flat.

34. In an apparatus for prebreaking carton blanks having a glue lap, a glue lap crease, a center crease, a mid-crease between the glue lap and center creases, and a mid-crease in the panel at the opposite side of the center crease, the combination of supporting and cooperating superposed carriers acting to move the blank therethrough, panel folder and panel opening means acting successively to prebreak the center crease and return the panel to open position, ironing means cooperating with a supporting carrier acting to iron the panel flat through 180° at the center crease as the panel is folded and a thin flat float member over which the panel is folded extending forward from the panel opener past the ironing means above the lower carrier and with its edge opposite the ironing means located away from the crease to permit the ironing means to iron the panel at the center crease directly against the lower carrier.

HAROLD S. LABOMBARDE.

REFERENCES CITED

The following references are of record in the file of this patent:

UNITED STATES PATENTS

| Number | Name | Date |
| --- | --- | --- |
| 836,235 | Adams | Nov. 20, 1906 |
| 1,211,757 | Reifsnyder | Jan. 9, 1917 |
| 1,298,586 | Sidebotham | Mar. 25, 1919 |
| 1,434,014 | La Bombard et al. | Oct. 31, 1922 |
| 1,684,903 | Young | Sept. 18, 1928 |
| 1,868,384 | Greenwood | July 19, 1932 |
| 1,878,745 | Wood | Sept. 20, 1932 |
| 2,238,010 | Breman | Apr. 8, 1941 |
| 2,485,952 | Apgar et al. | Oct. 25, 1949 |

FOREIGN PATENTS

| Number | Country | Date |
| --- | --- | --- |
| 588,750 | Germany | Dec. 2, 1933 |